United States Patent [19]

Merrer et al.

[11] Patent Number: 5,340,163
[45] Date of Patent: Aug. 23, 1994

[54] SAFETY SEALING CONDUIT CONNECTOR

[75] Inventors: Emile Merrer, Le Plessis Robinson; Michel M. J. Morel, Dammarie les Lys, both of France

[73] Assignee: Societe Nationale d'Etude et de Construction de Moteurs d'Aviation (S.N.E.C.M.A.), Paris, France

[21] Appl. No.: 171,706

[22] Filed: Dec. 22, 1993

[30] Foreign Application Priority Data

Dec. 23, 1992 [FR] France .................. 92 15540

[51] Int. Cl.⁵ .................. F16L 19/02
[52] U.S. Cl. .................. 285/93; 285/354; 285/334.4
[58] Field of Search .......... 285/93, 382, 382.7, 285/334.4, 341, 354; 403/27; 411/8, 9, 10

[56] References Cited

U.S. PATENT DOCUMENTS

| 2,404,142 | 7/1946 | Parker | 285/382.7 |
| 2,475,741 | 7/1949 | Goeller | 285/382.7 |
| 3,325,192 | 6/1977 | Sullivan | . |
| 4,150,847 | 4/1979 | DeCenzo | 285/93 |
| 4,346,918 | 8/1982 | Lycan | 285/93 |
| 4,522,433 | 6/1985 | Valentine | 285/93 |
| 4,655,159 | 4/1987 | McMills | 285/93 |
| 5,280,967 | 1/1994 | Varrin, Jr. | 285/93 |

FOREIGN PATENT DOCUMENTS

| 0384923 | 9/1990 | European Pat. Off. . |
| 255090 | 4/1912 | Fed. Rep. of Germany . |
| 453724 | 12/1927 | Fed. Rep. of Germany . |
| 546576 | 3/1932 | Fed. Rep. of Germany . |
| 835541 | 4/1952 | Fed. Rep. of Germany ...... 285/341 |
| 2421300 | 10/1979 | France . |
| 2660983 | 10/1991 | France . |
| 2027835 | 2/1980 | United Kingdom . |

Primary Examiner—Eric K. Nicholson
Attorney, Agent, or Firm—Bacon & Thomas

[57] ABSTRACT

A sealing connector for joining ends of two conduits is disclosed in which a collar is rotatably retained on an end of one of the conduits and is threaded onto the end of the other conduit to bring the sealing surfaces of the conduit ends into contact with each other. The collar has an end face and an internal shoulder facing in opposite directions such that the shoulder faces in the direction of movement as the collar is threaded onto the conduit end. A resilient ring member is located between the shoulder of the collar and the end of the conduit to which it is rotatably retained such that the resilient ring member is compressed during the connecting operation. Such compression causes deformation of the ring member which, in turn, causes a leg projecting from the ring member to come into contact with the collar and to extend beyond the end face of the collar.

10 Claims, 3 Drawing Sheets

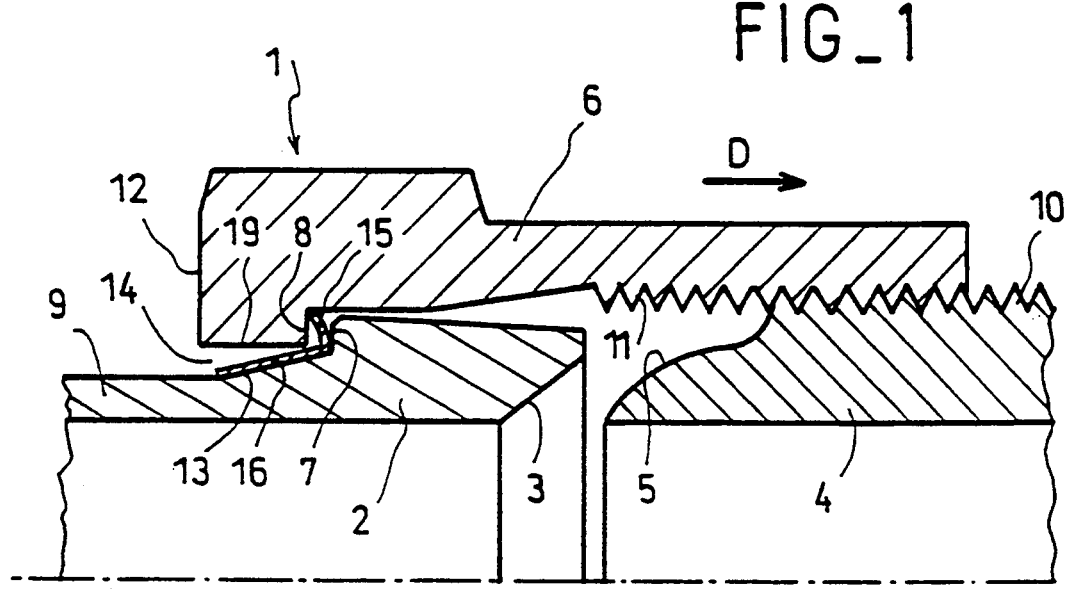
FIG_1
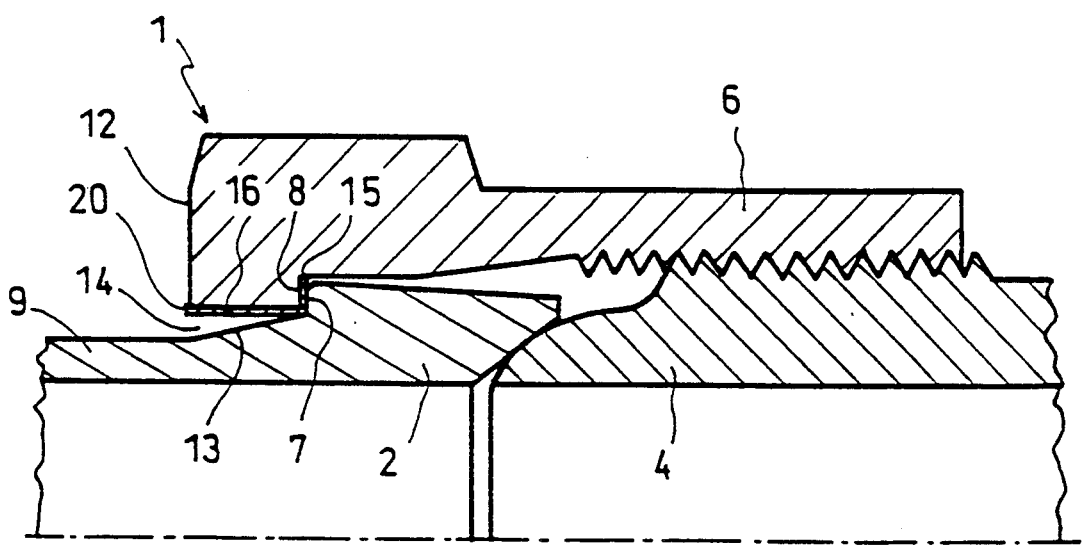
FIG_2

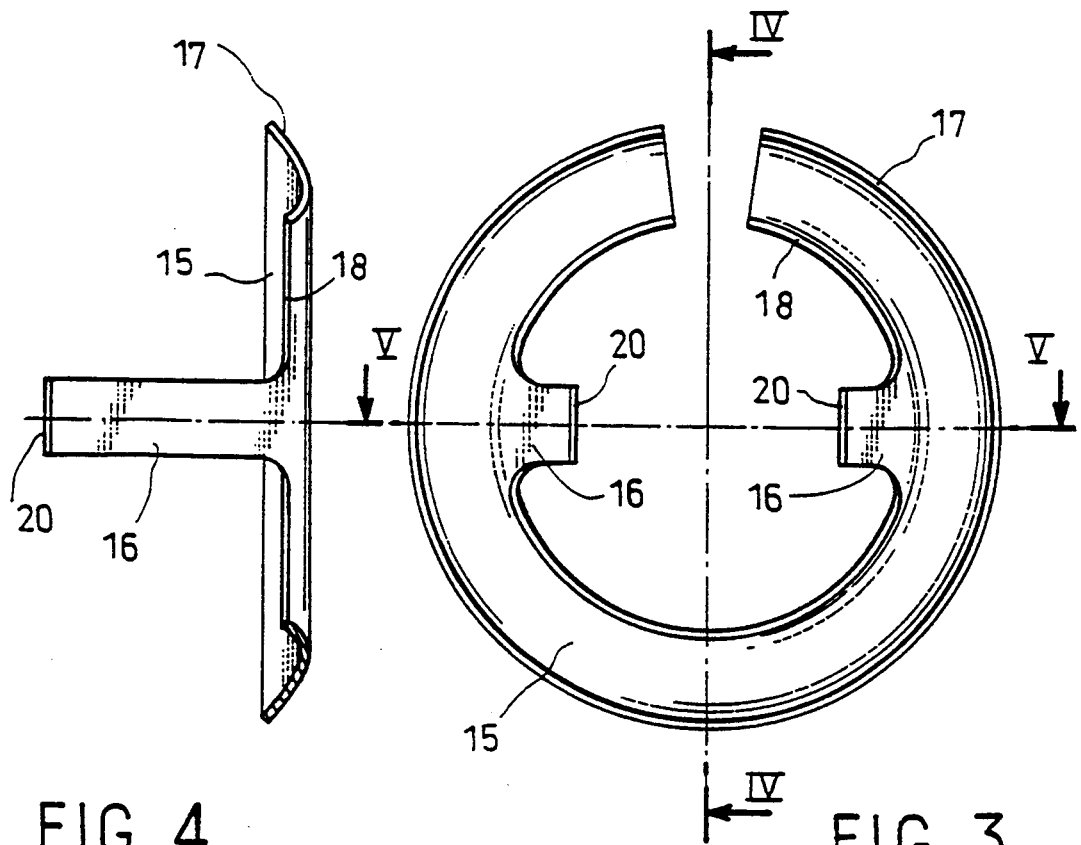
FIG_4   FIG_3
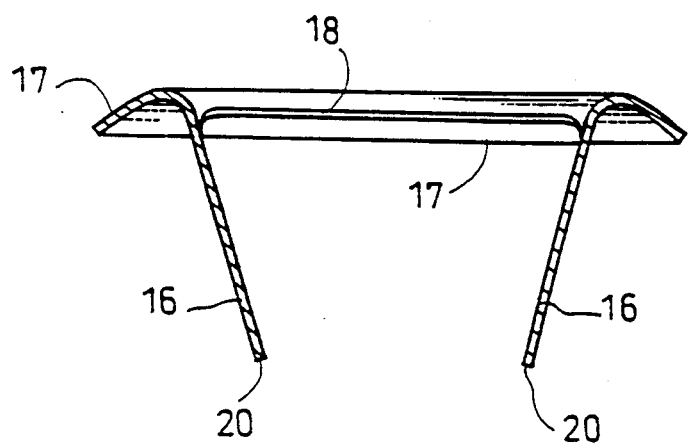
FIG_5

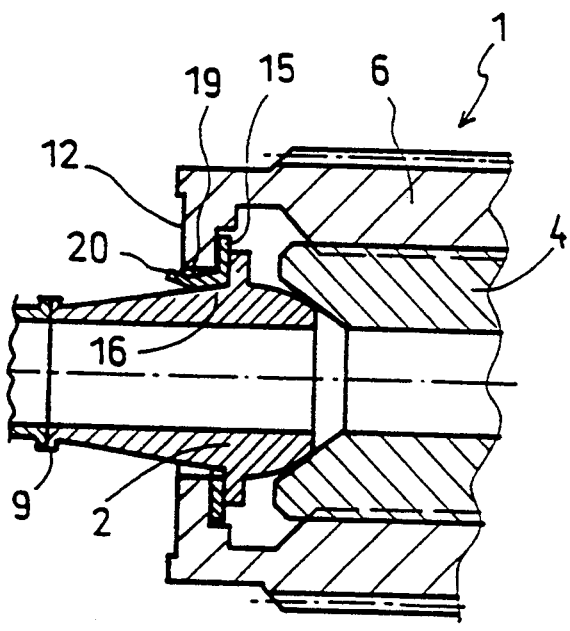
FIG_6
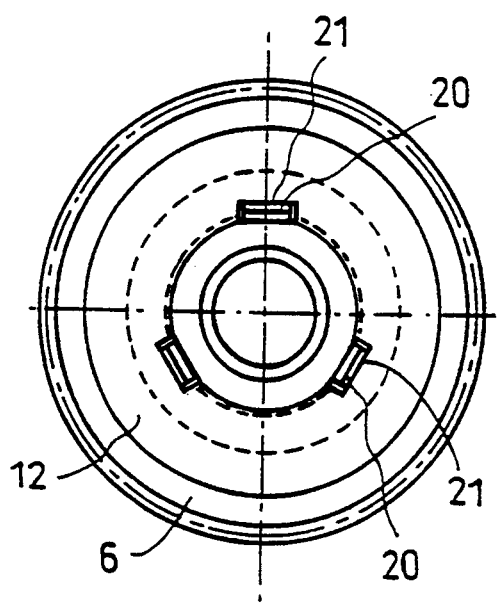
FIG_7
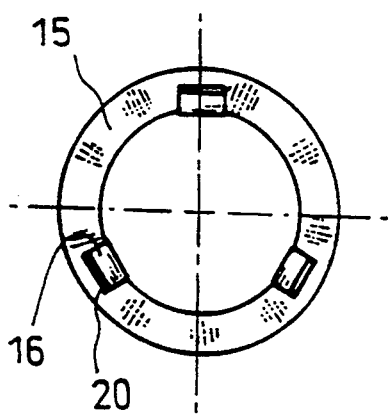
FIG_8
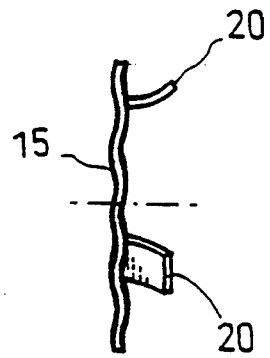
FIG_9

SAFETY SEALING CONDUIT CONNECTOR

BACKGROUND OF THE INVENTION

The present invention relates to a connector for joining the ends of two conduits which indicates when the conduits are properly connected and which prevents the breaking of the seal between the conduit ends should the connector become slightly loosened.

Devices for connecting the ends of two conduits so that fluid may be transmitted between the conduits without leakage are, of course, well known in the art. A typical example of such a connector is disclosed in French Patent 2 660 983 in which a thinner and deformed zone is formed in a threaded collar segment to assure tightening and self-locking of the connector within the collar.

However, when such a connector is used in aircraft engine applications, accidental loosening may take place because of the strong vibrations present in the engine, as well as the high and variable temperatures to which the engine is subjected. Such loosening cannot be tolerated in an aircraft engine environment, since a leak in the conduit connection can result in malfunction of the control, monitoring and/or the safety circuits. Also, if the conduit is conveying toxic or flammable fluid, the consequences of a leak in the connection can be catastrophic.

U.S. Pat. No. 3,325,192 discloses a connector having a tightness indicator projecting from the nut following deformation of the adjustment part during tightening. However, there is no assurance that this tightness indicator allows such an indication should the connection subsequently become loosened. Moreover, this disclosed connector does not provide for any means to retain the sealing connection in the event the connection becomes loosened. Thus, loosening of the connector quite possibly will result in leakage of fluid from the connection.

French Patent 2 421 300 discloses a connector device for affixing a wheel to a vehicle hub by a bolt or a nut, wherein the connection includes an axially elastic washer inserted between the bolt head and the wheel having at least one external axial projection projecting in the direction opposite of the bolt and nut displacement caused by tightening. The axial projection comprises an end element nesting in the bolt or nut when the axial flattening of the washer corresponds to the desired tightening force. The deformation and partial destruction of the washer prevents the wheel from coming off. However, this patent does not disclose the use of such a washer in a conduit connector.

Thus, it is desirable that aircraft conduit connectors be equipped with a device for precluding the loosening of the connectors and to further ensure that the sealing fit between the conduit ends is not breached should the connector become slightly loosened.

SUMMARY OF THE INVENTION

A sealing connector for joining ends of two conduits is disclosed in which a collar is rotatably retained on an end of one of the conduits and is threaded onto the end of the other conduit to bring the sealing surfaces of the conduit ends into contact with each other. The collar has an end face and an internal shoulder facing in opposite directions such that the shoulder faces in the direction of movement as the collar is threaded onto the conduit end. A resilient ring member is located between the shoulder of the collar and the end of the conduit to which it is rotatably retained such that the resilient ring member is compressed during the connecting operation. Such compression causes deformation of the ring member which, in turn, causes a leg projecting from the ring member to come into contact with the collar and to extend beyond the end face of the collar.

The position of the leg provides a visual indication that the conduit ends are in sealing contact and that the connection has been effected.

The resiliency of the resilient ring member is such that it will exert a force on the conduit end to which the collar is rotatably retained in a direction which will urge it into sealing contact with the other conduit end should the collar become slightly loosened.

The conduit end to which the collar is rotatably retained defines a generally conical surface which flares outwardly in the direction toward the end of the conduit. The ring member, in the absence of any tightening stresses applied thereto, may have an overall conical shape with the leg extending therefrom such that it normally contacts the conical surface. When the collar is sufficiently tightened to bring the end of the conduits into sealing contact, it will deform the ring member thereby causing the leg to pivot away from the conical surface into contact with the collar.

Alternatively, the ring member may take the form of an undulating washer having legs curving outwardly therefrom. Deformation of the undulating ring member caused by tightening of the collar brings the legs into contact with the collar. In both instances, the positions of the legs extending beyond the end face of the collar provides a positive visual indication that the connection has been sufficiently tightened. Should the collar become accidentally loosened, the resiliency of the ring member causes the legs to move back towards their original positions, again providing a visual indication that the collar is not sufficiently tightened.

BRIEF DESCRIPTION OF THE DRAWINGS

FIG. 1 is a partial, cross-sectional view of the connector according to the present invention prior to tightening.

FIG. 2 is a cross-sectional view similar to FIG. 1, illustrating the connector according to the present invention in its tightened position.

FIG. 3 is a front view of a first embodiment of the resilient ring member according to the present invention.

FIG. 4 is a cross-sectional view taken along line IV—IV in FIG. 3.

FIG. 5 is a cross-sectional view taken along line V—V in FIG. 3.

FIG. 6 is a partial, cross-sectional view illustrating a second embodiment of the connector according to the present invention.

FIG. 7 is a front view of the connector illustrated in FIG. 6.

FIG. 8 is a front view of the resilient ring member utilized in the embodiment illustrated in FIGS. 6 and 7.

FIG. 9 is a side view of the ring member illustrated in FIG. 8.

DETAILED DESCRIPTION OF THE PREFERRED EMBODIMENTS

As illustrated in FIGS. 1 and 2, a first embodiment of the present invention provides a sealing connector 1 which comprises a first conduit end 2 having a concave, sealing surface 3 and a second conduit end 4 which has a convex sealing surface 5 adapted to be sealingly engaged with the concave sealing surface 3. An external collar 6 is rotatably retained on the conduit end 2 so as to be concentric with the ends 2 and 4. The first conduit end 2 is seated inside the collar 6 and defines a shoulder 7 which faces away from the end of the conduit 2. Collar 6 is retained on the conduit end 2 by means of an inner annular shoulder 8 which axially bears against the shoulder 7 formed on the conduit 2. The conduit end 2 may be attached at portion 9 to any known type of conduit (not shown). The second conduit end 4 may also be affixed in any suitable manner to another conduit (not shown). The second conduit end 4 defines an external thread 10 which is adapted to be threadingly engaged with an internal thread 11 formed in collar 6.

Collar 6 defines an end face 12 which faces away from the annular shoulder 8 and is located on the end away from the internal threads 11. The second conduit end 2 defines a generally conical wall surface 13 in which the outer diameter increases in a direction toward the sealing surface 3 of the conduit end 2. The conical wall surface 13 and the inner surface 19 of collar 6 extending between the end face 12 and the shoulder 8 define a cavity 14 extending around the end of the end portion 2.

A frictionally locking, resilient ring member 15 is located between the shoulders 7 and 8 and has at least one leg 16 which extends therefrom such that the leg is located in the cavity 14 and extends toward the end face 12 of the collar 6. In a first embodiment, as illustrated in FIGS. 1-5, the resilient ring member 15 comprises a generally annular, generally conical shape in which the outer edge 17 bears against the shoulder 8 and the inner edge 18 is located at the juncture of the shoulder 7 and the conical wall surface 13. The legs 16 extend generally perpendicularly to the wall of the resilient ring member 15 and, in the absence of tightening of the collar 6, will rest against the conical wall surface 13 of the conduit end 2.

When the collar 16 is tightened onto the second conduit end 4, the resilient ring member 15 is deformed and flattened between the shoulders 7 and 8. Such deformation causes the legs 16 to pivot about the inner edge 18 and come to rest against the inner wall 19 of the collar 6 when the connector has been sufficiently tightened. As illustrated in FIG. 2, sufficiently tightening the collar 6 urges the sealing surfaces 3 and 5 into sealing contact to prevent any fluid leakage from the juncture of the conduit ends 2 and 4. The lengths of the legs 16 are such that their ends 20 project beyond the end face of the collar 6 when the collar has been sufficiently tightened to effect a sealing connection between the conduit ends.

In the event that collar 6 is inadvertently, partially loosened, the resilient ring member 15, due to its elasticity, will attempt to return to its initial shape, as illustrated in FIGS. 1 and 5. This causes the legs 16 to move away from the inner wall 19 of the collar 6 and to approach the conical wall surface 13. The ends 20 also retract into the cavity 14 due to the pivoting motion of the legs 16. Thus, the positions of the legs constitute visual indication that the collar 16 is insufficiently tightened.

The resilient ring member 15 will also urge the conduit end 2 into sealing contact with the conduit end 4 if the collar 6 is slightly loosened. Due to the elasticity of the resilient ring member 15, it will apply a force between the shoulders 8 and 7 urging the conduit end 2 in the direction of arrow D, illustrated in FIG. 1. Such force will urge the conduit end 2 into sealing contact with the conduit end 4 to prevent accidental leakage of the fluid should the collar 6 become inadvertently loosened. The resilient ring member may, alternatively, define a plurality of generally radially extending slits.

A second embodiment of the invention is illustrated in FIGS. 6-9. In this embodiment, the resilient ring member 15 is a continuous, annular washer that forms undulations in the circumferential direction. The locking effect may be enhanced in this embodiment by providing the shoulders 7 and 8 with undulations similar to those of the resilient ring member 15. The resilient ring member 15 has a plurality of legs 16 which extend therefrom toward the end face 12 of the collar 6. In this embodiment, the inner wall 19 of the collar 6 may define a plurality of axially extending channels 21 into which the legs 16 extend when the resilient ring member 15 has been deformed.

As illustrated in FIG. 9, the ends 20 of the legs 16 may be curved radially outwardly away from the center of the resilient ring member. Thus, when the collar 6 is tightened sufficiently, the ends 20 project beyond the end face 12 due to the deformation of the resilient ring member 15 which is flattened between the shoulders 7 and 8. Thus, as in the previous embodiment, the positions of the ends 20 constitute a visual indication that the collar 6 has been sufficiently tightened. Again, if the collar 6 becomes accidentally loosened, the resilient ring member 15 is such that it will tend to return to its original configuration and the legs will provide a visual indication of such loosening. Also, the resilient ring member will exert a force between the shoulders 7 and 8 urging the conduit end 2 into sealing contact with the conduit end 4 to prevent fluid leakage.

The curvature of the legs 16 in the second embodiment may be such that the resilient ring member 15 may be retained in position on the collar 6 by slightly deforming the legs inwardly until they extend through the axial channels 21. Upon release of the legs 16, their natural resiliency will urge them slightly outwardly such that they engage the axial channels 21 and hold the resilient ring member 15 on the collar 6.

The foregoing description is provided for illustrative purposes only and should not be construed as in any way limiting this invention, the scope of which is defined solely by the appended claims.

We claim:
1. A sealing connector for joining ends of two conduits having mating surfaces thereon, comprising:
 a) means defining first threads on a first one of the two conduits;
 b) a collar retained on the second one of the two conduits and comprising a threaded portion having second threads engageable with the first threads such threaded engagement urging the mating surfaces of the two conduits into sealing engagement the collar having an end face and a shoulder facing away from the end face;
 c) a resilient ring member located between the shoulder of the collar and the second of the conduits on which the collar is retained, the resilient ring member having a generally annular, non-planar configuration, the resiliency being such that the ring member is deformed into a substantially planar configuration between the shoulder and the second of the two conduits when the mating surfaces are in sealing contact; and, d) at least one leg extending from the resilient ring member, the at least one leg extending beyond the end face at least when the ring member is deformed into its substantially planar configuration.

2. The sealing connector of claim 1 further comprising a substantially conical surface defined by the second one of the two conduits, the surface flaring outwardly in a direction towards the mating surface of the conduit wherein the at least one leg bears against the substantially conical surface when the ring member is in its non-planar configuration.

3. The sealing connector of claim 2 wherein the ring member defines a generally radially extending gap therethrough.

4. The sealing connector of claim 2 wherein the ring member defines at least one generally radially extending slit.

5. The sealing connector of claim 1 wherein the ring member is undulant in a circumferential direction.

6. The sealing connector of claim 5 further comprising at least one axial channel defined by the collar extending between the end face and the shoulder so as to accept the at least one leg therein.

7. The sealing connector of claim 5 wherein the at least one leg curves radially outwardly in a direction away from the ring member.

8. The sealing connector of claim 1 comprising two legs extending from the ring member, the two legs being located generally diametrically opposite each other on the ring member.

9. The sealing connector of claim 1 comprising three legs extending from the ring member.

10. The sealing connector of claim 1 wherein the ring member has a generally conical configuration.

* * * * *